(12) United States Patent
Malachi

(10) Patent No.: US 9,516,054 B2
(45) Date of Patent: Dec. 6, 2016

(54) SYSTEM AND METHOD FOR CYBER THREATS DETECTION

(71) Applicant: CYBER SENSE LTD., Ness Ziona (IL)

(72) Inventor: Yuval Malachi, Hod Hasharon (IL)

(73) Assignee: TRAP DATA SECURITY LTD., Tel-Aviv (IL)

( * ) Notice: Subject to any disclaimer, the term of this patent is extended or adjusted under 35 U.S.C. 154(b) by 0 days.

(21) Appl. No.: 14/251,982

(22) Filed: Apr. 14, 2014

(65) Prior Publication Data

US 2015/0295943 A1     Oct. 15, 2015

(51) Int. Cl.
*G06F 12/16* (2006.01)
*H04L 29/06* (2006.01)

(52) U.S. Cl.
CPC ........ *H04L 63/145* (2013.01); *H04L 63/1416* (2013.01); *H04L 63/1491* (2013.01)

(58) Field of Classification Search
USPC ............................... 726/24, 23, 25; 713/188
See application file for complete search history.

(56) References Cited

U.S. PATENT DOCUMENTS

| | | | |
|---|---|---|---|
| 8,370,938 B1* | 2/2013 | Daswani et al. ................. | 726/23 |
| 8,516,590 B1* | 8/2013 | Ranadive ............ | H04L 63/1483 713/187 |
| 8,555,391 B1* | 10/2013 | Demir ..................... | H04L 67/20 713/187 |
| 8,683,584 B1* | 3/2014 | Daswani ............... | G06F 21/577 726/22 |
| 8,839,417 B1* | 9/2014 | Jordan ................ | H04L 63/1416 709/223 |
| 8,839,433 B2* | 9/2014 | O'Reirdan .......... | H04L 63/1416 709/207 |
| 8,863,288 B1* | 10/2014 | Savage ................. | G06F 21/567 713/188 |
| 8,990,945 B1* | 3/2015 | Ranadive ............ | H04L 63/1483 713/187 |
| 2004/0254906 A1* | 12/2004 | Shei et al. ..................... | 706/921 |
| 2006/0212723 A1* | 9/2006 | Sheymov ...................... | 713/194 |
| 2009/0077666 A1* | 3/2009 | Chen et al. ..................... | 726/25 |
| 2009/0241190 A1* | 9/2009 | Todd ....................... | G06F 21/53 726/23 |
| 2009/0241191 A1 | 9/2009 | Keromytis et al. | |
| 2011/0214182 A1* | 9/2011 | Adams et al. .................. | 726/23 |
| 2011/0225655 A1* | 9/2011 | Niemel et al. .................. | 726/24 |
| 2012/0096539 A1 | 4/2012 | Hu et al. | |
| 2012/0180132 A1* | 7/2012 | Wu ................................ | 726/24 |
| 2012/0266243 A1* | 10/2012 | Turkulainen .................... | 726/24 |
| 2013/0117848 A1* | 5/2013 | Golshan ................. | G06F 21/53 726/23 |
| 2014/0096250 A1* | 4/2014 | Belov ............................ | 726/23 |
| 2014/0130161 A1* | 5/2014 | Golovanov ........... | G06F 21/564 726/23 |
| 2015/0096022 A1* | 4/2015 | Vincent ................ | G06F 21/566 726/23 |

OTHER PUBLICATIONS

PCT Search Report—(PCT/IL2015/050398) Dated Sep. 24, 2015.

* cited by examiner

*Primary Examiner* — Amare F Tabor
(74) *Attorney, Agent, or Firm* — Pearl Cohen Zedek Latzer Baratz LLP

(57) ABSTRACT

A system and method for detecting a cyber-threat according to embodiments of the present invention comprise automatically discovering resources on a network, by a resource detection unit, emulating, by a faked asset creation unit, at least one resource discovered on the network, associating a malware trap sensor with the emulated resource and detecting by the malware trap sensor, a malware related to the emulated resource. The system and method may further comprise uploading data related to the detected malware to a server, analyzing, by the server, uploaded data to produce an analysis result and perform one or more actions based on the analysis result.

18 Claims, 3 Drawing Sheets

SYSTEM AND METHOD FOR CYBER THREATS DETECTION

BACKGROUND OF THE INVENTION

System and methods for preventing cyber threats are known in the art. For example antivirus software may detect computer viruses and firewalls may prevent access to protected systems. However, known systems and methods suffer from a number of drawbacks. For example, an antivirus software may only detect a virus or malware when performing a scan of a computer, e.g., once a day, but cannot detect a malware in a system in real-time. Moreover, an antivirus generally operates based on predefined signatures of malware and therefore not be suitable for identification of new malwares. Similarly, firewalls typically operate based on a predefined list of blocked ports and therefore may not be capable of preventing malware from accessing a system using open or non-blocked ports.

SUMMARY OF EMBODIMENTS OF THE INVENTION

Embodiments of the present invention provide a method of detecting a cyber-threat, the method may comprise: automatically discovering resources on a network; emulating at least one resource discovered on the network; associating a malware trap sensor with the emulated resource; detecting, by the malware trap sensor, a malware related to the emulated resource and uploading data related to the detected malware to a server; analyzing, by the server, uploaded data to produce an analysis result; and performing at least one action based on the analysis result.

According to some embodiments, the method may further comprise analyzing network traffic related to the emulated resource to detect an interaction of a malware with the emulated resource.

According to embodiments of the present invention, automatically discovering resources on the network may be performed by one of: a virtual machine and a hardware appliance.

According to some embodiments, the method may comprise automatically determining a type of the network and emulating at least one resource based on the type.

According to some embodiments, emulating at least one resource includes running a service at an operating system kernel level and detecting an interaction of a malware with the emulated resource includes detecting an interaction with the service.

The method, according to some embodiments, may comprise emulating a system and monitoring network traffic from the emulated system to detect data sent by malware.

The method, according to some embodiments, may comprise: capturing payloads of malwares stored on emulated resources; analyzing the payloads to produce an analysis result; determining, for each of the payload, a severity score based on the analysis result; and providing a report based on the scores.

According to some embodiments, the method may comprise receiving, by a management unit, from one or more malware traps, data and events related to malware; analyzing the payloads to produce an analysis result; determining, for each of the payloads, a severity score based on the analysis result; and providing a report based on the scores.

According to some embodiments, detecting a malware related to the emulated resource, uploading data related to the detected malware, analyzing the uploaded data and performing an action based on the analysis are performed in real-time.

According to some embodiments, the method may comprise storing faked files on an emulated resource and detecting an access to the faked files.

The method, according to some embodiments may comprise: emulating a system; detecting a login into the emulated system; and collecting data related to the login and to an entity related to the login; sending collected data for analysis by the server; and performing an action based on the analysis.

According to some embodiments emulated resources are created based on user input.

According to some embodiments a severity score is set based on user input.

Embodiments of the present invention further provide a system for cyber threats detection. The system may comprise: a server comprising a management unit; a client network; an external network; and a computer comprising a user interface unit. The client network may comprise a resource detection unit; an asset inventory; a faked assets creation unit; and a plurality of faked assets.

According to some embodiments, resource detection unit may be adapted to maintain and update said asset inventory.

According to some embodiments, each faked asset comprises a malware trap.

According to some embodiments, the resource detection unit may include at least a processor and a memory.

According to some embodiments, the resource detection unit may automatically discover and identify resources or assets on the client network.

According to some embodiments, the faked assets creation unit may create the emulated assets.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
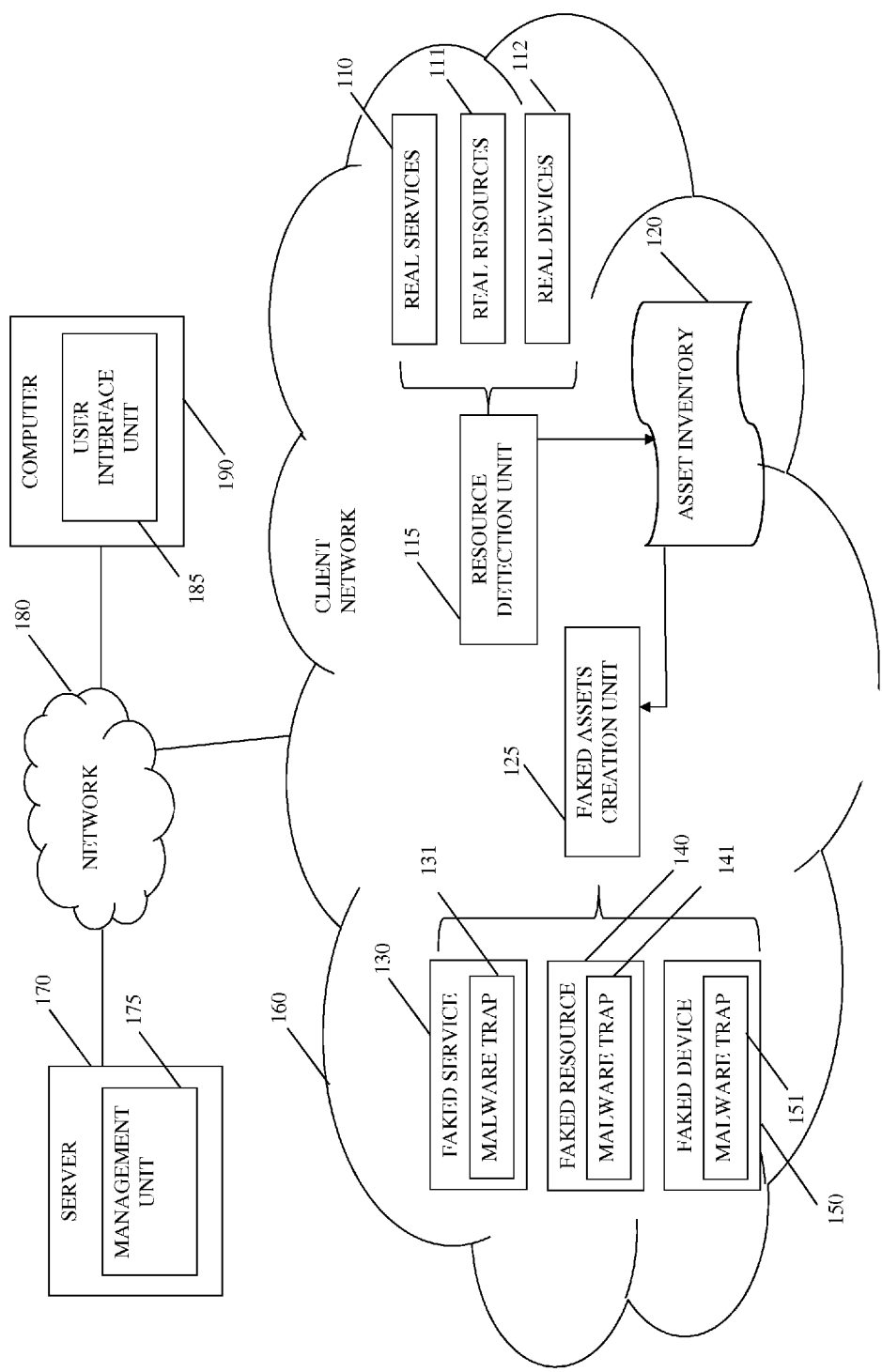
FIG. 1 shows a high level block diagram of an exemplary system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

It will be understood that the term "malware" used herein refers to any malicious software, e.g., computer viruses or Trojans as known in the art. The term "asset" may refer to any resource, device or service in a network as further described herein.

Reference is made to FIG. 1, a high level block diagram of an exemplary system according to embodiments of the invention. As shown, a system may include a server 170 that includes a management unit 175, a network 180 that may be, for example, the internet and a computer 190 that includes a user interface unit 185. As further shown, a system may include a plurality of units included in, or connected to, client network 160. As shown, a system may include a resource detection unit 115, a faked assets creation unit 125, an asset inventory 120 and a plurality of faked assets as shown by faked service 130, faked resource 140 and faked device 150. As shown by blocks 131, 141 and 151, a faked asset may include a malware trap. As further shown, a system may carry out an automated process that includes discovering real assets, e.g., real assets as shown by real services 110, real resources 111 and real devices 112.

As shown, a system may include a resource detection unit 115 that may maintain or update an asset inventory 120. For example, resource detection unit 115 may detect real resources or assets such as real services 110, real resources 111 and real devices 112 in network 160 and update asset inventory 120 accordingly.

Real services, resources and assets and faked or emulated services, resources and assets are discussed herein. Generally, as referred to herein, a real service, resource and/or asset relates to a service, resource and/or asset as known in the art. For example, a real device as shown by 112 may be a hardware device installed on network 160 in order to perform actual tasks, e.g., a real asset or a real device may be an actual server connected to network 160. A real resource as shown by block 111 may be a database in network 160 that can actually store data and provide stored data or it may be a DNS server or service that can actually translate domain names to IP addresses.

In contrast, as referred to herein, faked, emulated or imitated services, resources and assets are not real assets that can be readily used by users or applications, rather, faked emulated or imitated assets may be established by, or may include advertising services without actually providing the advertised services. For example, to generate or establish a faked, emulated or imitated DNS service, faked service 130 may broadcast DNS packets on network 160 even though faked service 130 does not include the capacity to actually translate domain names to IP addresses. For example, faked service 130 may be a unit (e.g., a software or hardware unit or module) that sends DNS messages typically sent by a DNS server although the unit does not actually provide any DNS related services.

As further described herein, faked emulated or imitated assets are generated or established on network 160 in order to attract or cause an attacker to interact with them. As further described, an interaction with a faked emulated or imitated service may be used in order to identify an attacker.

As shown, a system may include a faked assets creation unit 125 that may obtain data from asset inventory 120 and create faked assets (or faked resources or faked devices) as shown by faked service 130, faked resource 140 and faked device 150. As shown, a faked resource may include a malware trap. For example and as shown, faked service 130 may include a malware trap 131, faked resource 140 may include a malware trap 141 and faked device 150 may include a malware trap 151.

Server 170 and computer 190 may be any suitable computing devices, for example, a computing device similar to computing device 300 described herein. Network 180 may be any network enabling computers to communicate. For example, network 180 may be the internet and may enable computer 190 to communicate with server 170 and/or enable computer 190 and server 170 to communicate with any computing device in network 160. For example, bridges or routers as known in the art may connect networks 160 and 180.

Client network 160 may be any network in an organization, e.g., an internet protocol (IP) network that enables computing devices to communicate. Client network 160 may include a number of sub-networks, network devices such as routers or switches etc. For the sake of simplicity, various components (e.g., switches and routers) included in networks 180 and 160 are not shown. When discussed herein, network 160 may be referred to as an environment. For example, when discussing a device or resource included in network 160 it is meant that the device or resource is part of an environment and can be reached or interacted with using network 160. Accordingly, the terms "included in network 160" and "connected to network 160" may generally mean the same thing and may be used herein interchangeably.

Real services 110, real resources 111 and real devices 112 may be any services, resources and devices owned, installed, operated and/managed by a client who owns, operates and/or maintains client network 160. For example, real devices 112 may be servers in an organization, e.g., a mail server a database server etc., real resources 111 may include a number of storage systems and real services 112 may be any computerized services, e.g., a domain name service (DNS), a Lightweight Directory Access Protocol (Ldap) Server, or a Hypertext Transfer Protocol (HTTP) Server.

Although only exemplary assets real services 110, real resources 111 and real devices 112 are shown, it will be understood that embodiments of the invention may be applicable to various other computing related assets in a client network or environment, e.g., routers or bridges and the like. Generally, any asset in a network or environment that may be attacked, or targeted by a cyber attack may be applicable and may benefit from embodiments of the invention as described herein. It will be understood that real assets and faked assets discussed herein may include hardware assets, e.g., computers, network devices, storage systems and the like, and/or software or virtual assets, e.g., software provided services or resources provided by servers in an organization.

Resource detection unit 115 may be a dedicated hardware device or appliance (e.g., a computing device similar to computing device 300) or it may be a software module or application executed on a server or computing device that may run or execute other applications. For example, in an embodiment, resource detection unit 115 may be a virtual machine as known in the art or it may be a software module installed in a virtual machine. Accordingly, resource detection unit 115 may be any suitable unit or module, e.g., a virtual machine or a hardware appliance.

In an embodiment, resource detection unit 115 includes at least a controller or processor and a memory that stores instructions or executable code (e.g., controller 305 and memory 320 in computing device 300) and when the instructions are executed by the controller they cause the controller to carry out methods and operations as described with respect to resource detection unit 115.

Resource detection unit 115 may automatically detect assets on network 160. Resource detection unit 115 may automatically discover and/or identify resources or assets on network 160. For example, resource detection unit 115 may include a sniffing unit adapted to capture packets or messages on network 160. Generally, network sniffers are known in the art as units capable of capturing and analyzing network packets or messages. Detection unit 115 may include a network sniffer as known in the art or it may be connected to a network sniffer. Having obtained network messages or data, detection unit 115 may analyze captured data and, based on an analysis of the captured data, determine or identify network assets.

For example, as known in the art, some assets broadcast or otherwise advertise services they provide by sending network packets that provide information related to the type of service being provided or information required in order to use the assets. For example, as known in the art, network devices such as routers and switches send or broadcast Simple Network Management Protocol (SNMP) messages (also known as Traps) to other devices and monitoring systems in the network. Detection unit 115 may capture network packets that inform of services and thus determine available or existing real service or real assets on network 160. For example, one of real services 110 may be a DNS service that periodically advertises the service. Detection unit 115 may capture messages sent from the DNS service, and determine one of the real service in network 160 is a DNS service.

Real resources, assets or services may be detected by resource detection unit 115 by probing. For example, ping is a utility known in the art that can be used in order to determine that an application is listening on a specific network port in a specific IP address. Resource detection unit 115 may ping a set of IP addresses and ports in order to discover real assets on network 160. For example, the port on which a DNS server or service can be reached or communicated with is known in the art, resource detection unit 115 may ping the DNS port on a set of IP addresses and discover that an actual or real DNS service is provided by a real device in network 160.

Messages received from computers on a network may be used in order to determine or identify an environment. For example, values of parameters used by a specific operating system may be used. For example, the value of the time to live (TTL) field in a response to an ICMP ping set by a Linux computer may be known. Accordingly, by sending ICMP ping messages to hosts or computers on a network and analyzing the responses to the ping messages, a system or method according to embodiments of the invention may determine which operating systems are present on the network. Generally, the set of operating systems in a network may define the computing environment. Accordingly, a method of detecting a cyber threat according to embodiments of the invention may include automatically discovering resources on a network.

Resource detection unit 115 may automatically determine a type of a network. For example, a network type may be a Microsoft Datacenter network as known in the art and resource detection unit 115 may automatically determine the type of the network by identifying server message block (SMD) share messages broadcasted or sent over the network. Based on a type of the network, faked assets may be established as described herein. For example, if resource detection unit 115 determines the type of network 160 is Microsoft servers then it may include the type in asset inventory 120 and faked assets creation unit 125 may create or establish faked assets such as DNS or Active Directory services. Accordingly, creating faked assets may be based on identifying assets in a network, based on identifying the network type or based on both identified assets and network type.

A method of detecting a cyber threat according to embodiments of the invention may include emulating one or more resources discovered on a network. For example, after resource detection unit 115 discovers real assets such as real services 110, real resources 111 and real devices 112, resource detection unit 115 updates asset inventory 120 such that the discovered assets are recorded in asset inventory 120. For example, asset inventory 120 may be a file on a hard disk or it may be a table or list in a memory. For example, asset inventory 120 may be a list or table in which each entry or row includes information related to a discovered asset. For example, the name and type of the asset may be included in asset inventory 120 as well as an IP address and/or port. Any information that may be required in order to emulate a real asset may be included in asset inventory 120. Asset inventory 120 may be any object or entity that is accessible to both resource detection unit 115 and faked assets creation unit 125.

Resource detection unit 115 may dynamically and/or continuously update asset inventory 120. For example, resource detection unit 115 may automatically add entries or information to asset inventory 120 when new assets are discovered and may remove assets from asset inventory 120 when it determines that assets previously discovered and entered into asset inventory 120 are no longer present on network 160. For example, having discovered a real device on network 160, resource detection unit 115 may update asset inventory 120 to include information related to the newly discovered device. Resource detection unit 115 may then periodically ping the devices in order to determine the device is available on network 160, if resource detection unit 115 determines the device is no longer available (e.g., the device does not respond to pings), resource detection unit 115 may remove the device from asset inventory 120.

Resource detection unit 115 may alert faked assets creation unit 125 upon change, update or modification made to asset inventory 120. For example, upon adding a new asset to asset inventory 120, resource detection unit 115 may alert faked assets creation unit 125. When notified of a change made to asset inventory 120, faked assets creation unit 125 may read updated asset inventory 120 and may establish new faked assets or may remove faked assets based on information in updated asset inventory 120. In other embodiments, faked assets creation unit 125 may periodically access asset inventory 120 and add or remove faked assets based on data in asset inventory 120. In yet other embodiments, faked assets creation unit 125 may access asset inventory 120 and add or terminate faked assets based on any preconfigured event or command, e.g., an expiry of a timer or a command from a user or management unit. Accordingly, faked assets may be dynamically created or terminated such that they closely imitate real assets.

In some embodiments, faked assets may be created based on a policy, rule, configuration or criteria. For example, faked assets creation unit 125 may be provided with a configuration file or data (not shown) that may indicate the number of faked assets to be created for specific asset type, parameters to be used for specific faked assets and the like. For example, if it is known that a specific real asset type is in more danger of being attacked then other asset types, more faked assets of that type may be created in order to lure an attacker to attack the faked assets. Accordingly, faked assets creation unit 125 may establish or create faked assets based on asset inventory 120 and based on any other configuration, parameters or data. Faked assets may be created based on user input. For example, using user interface unit 190 a user may add entries to asset inventory 120 and thus cause faked assets creation unit 125 to generate or create faked assets. For example, in an embodiment, faked assets creation unit 125 periodically reads or checks asset inventory 120 in order to determine whether new faked assets are to be created or existing faked assets are to be terminated. If a new asset is inserted into asset inventory 120 by a user then the next time faked assets creation unit 125 checks asset inventory 120, the newly entered asset will be automatically created.

Faked, emulated or imitated assets may be created or established or they may operate at any level or layer. For example, as described, a faked asset may be generated by a software module that may be an application. In an embodiment, a faked resource or asset may be a service that runs at an operating system's kernel level. For example, kernel level services are known in the art and are often a target for malware attacks since by gaining access to kernel level resources, an attacker may gain access to sensitive data and/or may be able to perform otherwise restricted operations. Accordingly, in an embodiment, emulating a resource may include running a service at an operating system's kernel level.

Emulating or faking a resource may include emulating a system. For example, a storage system, an operating system, a mail system or any other system may be emulated in order to attract an attacker or malware to penetrate the system. An interaction with an emulated system may be detected. For example, by monitoring network traffic to/from the emulated system.

For example, a storage system may be emulated, e.g., by sending, on a network, messages typically sent by a database system. Emulating a system, e.g., a database may include storing faked files on the emulated system. For example, files that contain meaningless or randomly generated data may be stored on a device used for emulating a database. It may be assumed that no user or application will ever access such faked files since. However, a malware that installs itself on the emulated database may not be aware of the fact that the database is a faked entity and that the files stored thereon are useless and may therefore access the faked files. By monitoring access to faked files stored in a faked database, a system or method according to embodiments of the invention may detect an activity of a malware. Monitoring may include intercepting access to the faked files, determining who the accessing entity is and thus identifying the malware. Intercepting access to faked files may be done as known in the art, e.g., by intercepting system calls.

In another example or embodiment, an emulated or faked system may be of a type into which a user or application may login, for example, a Unix or Windows system. Since it may not be expected that any user or application in an organization would attempt to login to an emulated or faked Unix or Windows system, an attempt to login to the emulated system may be assumed to be made by a malicious entity. An embodiment of a system or method may monitor login attempts into an emulated or faked system, collecting data related to the login attempt, e.g., any data related to the user or application attempting to login, sending the collected data for analysis (e.g., on management unit 175, and performing an action based on the analysis.

An embodiment of a system or method may include associating a malware trap or a sensor with an emulated resource or with a faked asset. For example, when creating faked service 130, faked creation unit 125 associates malware trap 131 with faked service 130. Generally, a malware trap and/or a sensor may identify or intercept an interaction with an associated faked asset, may analyze any data related to the entity interacting with the associated faked asset and may perform various actions in based on, or in response to, the interaction. For example, when a sensor or malware trap detects in interaction with a faked asset, the malware trap may generate a report and send the report to management unit 175. For example, a report generated by a malware trap included in or associated with a faked resource or faked asset may include any information related to the user or application that interacts or interacted with the faked resource.

A malware trap or a sensor may upload data to management unit 175. For example, if an interaction with a faked device includes storing data (e.g., storing a binary file or code) on the faked device then the associated malware trap may upload the data stored on the faked asset to management unit 175. For example, a faked device such as faked device 150 may be a software module or a hardware device that enables an attacker to download executable code to the faked device. For example, as known in the art, Trojans typically operate by downloading executable code to a target device and executing the code on the target device, e.g., in order to scan attached storage systems, modify various files etc. In an embodiment, a malware trap may detect a download of code to a faked device or asset and may upload the downloaded code to management unit 175 where the code may be analyzed or otherwise processed.

An embodiment of a system or method may include analyzing uploaded data to produce an analysis result. For example, management unit 175 may receive files, code segments or any other data that was downloaded onto faked assets and may analyze the received data. An analysis of data that was captured on faked assets as described herein may include examining any aspect in order to determine the source of the code, the operations that the code is designed to perform etc. Generally, any analysis as known in the art, e.g., analysis of malware or computer virus code as known in the art may be performed on code captured on faked devices. It will be noted that an analysis of data captured on faked devices as described may be performed in real-time, e.g., management unit 175 may analyze data sent from malware traps immediately upon receiving the data.

An embodiment of a system or method may include performing at least one action based on an analysis result. For example, having analyzed a code segment sent or uploaded from one of malware traps 131, 141 or 151, management unit 175 may determine the code segment is a computer virus and may immediately alert an administrator of network 160. Other operations may include sending an electronic mail to a predefined recipient list, calling a pager and the like. Yet other operations may include updating user interface unit 185, accordingly, a graphical or other report presented by user interface unit 185 may, in real-time, show threats to a user. Other operations may include controlling operational aspects of devices on network 160. For example, management unit 175 may, upon determining a virus was downloaded to a faked device, cause routers in network 160 to isolate segments of network 160.

An embodiment of a system or method may include analyzing network traffic related to a faked or emulated resource. A system or method according to embodiments may analyze network traffic related to an emulated resource to detect an interaction of a malware with the emulated resource. For example, network traffic originating from faked device 150 may be captured and analyzed. For example, port mirroring that includes copying or sending any data received by a switch port to another port in the switch (or to a predefined destination address) is known in the art. In an embodiment, a faked asset such as faked device 150 or faked service 130 may be configured to only send data to a specific port in a network switch and, using port mirroring, all data sent from the faked asset may be captured, e.g., by an associated malware trap or by another unit. Data sent or originating from a faked asset may be analyzed. Some of the data that is sent from the faked device (and captured as described herein) may be related to the intended operation of the faked device (e.g., messages advertizing a service as described herein), such data may be ignored by the unit that receives data originating from the faked asset. However, some of the data originating at the faked device may be related to malware. For example, a Trojan, virus or malware that has installed itself on a faked device may send data. For example, as known in the art, some malwares install themselves on computers and then send files found on the computers to a predefined destination thus providing a malicious entity with access to files in remote computers.

As described, by capturing data sent from a faked asset, a system and method according to embodiments of the invention obtain data sent by malware. For example, in some cases, malware code spreads by installing itself in a first computer and then sending itself (that is, sending a copy of the malware code) to other computers in the network. Accordingly, by capturing all data sent from a faked device or asset, filtering out data known to be sent by the faked asset according to its configuration, a system and method are able to capture the actual malware code or payload as referred to in the art.

Of course, not only the actual malware code or payload can be captured as described but any data sent by the malware. Any data sent by the malware and captured as described may be analyzed. For example, captured data sent by malware may be uploaded to management unit 175 as described, may be analyzed and an action may be performed as described. It will be understood that networks traffic flowing to a faked device may be captured in a way similar to the way networks traffic flowing from a faked device is captured. Accordingly, any interaction with a faked device, and in particular, any network traffic to/from a faked asset may be captured, analyzed and acted upon as described. Therefore, a system or method according to embodiments of the invention may detect an interaction of malware with a faked asset.

In an embodiment, payloads of malwares (or the actual malware code or application) stored on emulated resources may be analyzed to produce analysis results. Based on the analysis result, a severity score may be associated with a payload (or with the malware). A report provided to a user may include, or be based on, a severity score.

For example, management unit 175 may analyze data related to malware and associate the analyzed data (or the malware) with a severity score. For example, some malware operated by downloading an application onto a target computer and causing the application to execute on the target computer. For example, to obtain sensitive information, a malware application downloaded to a target computer may send files stored on the computer to a predefined destination, e.g., a computer on the internet owned by the owner of the malware. The malware application is also referred to herein as the payload or code of the malware.

In an embodiment, a malware application (or payload) is allowed (or even attracted) to be stored on a faked device. The malware application is then sent (e.g., by a malware trap as described) to an analysis unit, e.g., to management unit 175. Management unit 175 may be provided with rules, criteria, configuration parameters or other information and use provided data in order to associate a malware or a payload with a severity score based on an analysis result. For example, management unit may be provided with a list of malware types and associated severities and may use such list to associate a severity to a malware. For example, a list of malware types or names and associated severities may be provided by a user, accordingly, a severity score associated with a malware may be based on user input.

For example, malwares that send files from an attacked or target computer to a remote computer may be associated a first severity score, malwares that delete files may be associated a second, higher or lower severity score and malware that modify files may be associated a third severity score. Based on analysis of a payload of a malware, management unit 175 may determine the malware type and associate a severity code to the malware based on the type, e.g., as described herein. Uploading malware code or payload, analyzing malware code or payload to produce an analysis result and performing an action based on the analysis result may be performed or carried out in reap-time. For example, malware code or payload may be uploaded to management unit 175 immediately when installed on a faked device. Management unit 175 may analyze or process received payloads at the rate they are received and produce analysis results Immediately after producing an analysis result, management unit 175 may perform an action, e.g., alert an administrator, send an electronic mail, re-configure a router in network 160 etc.

Figure 2:
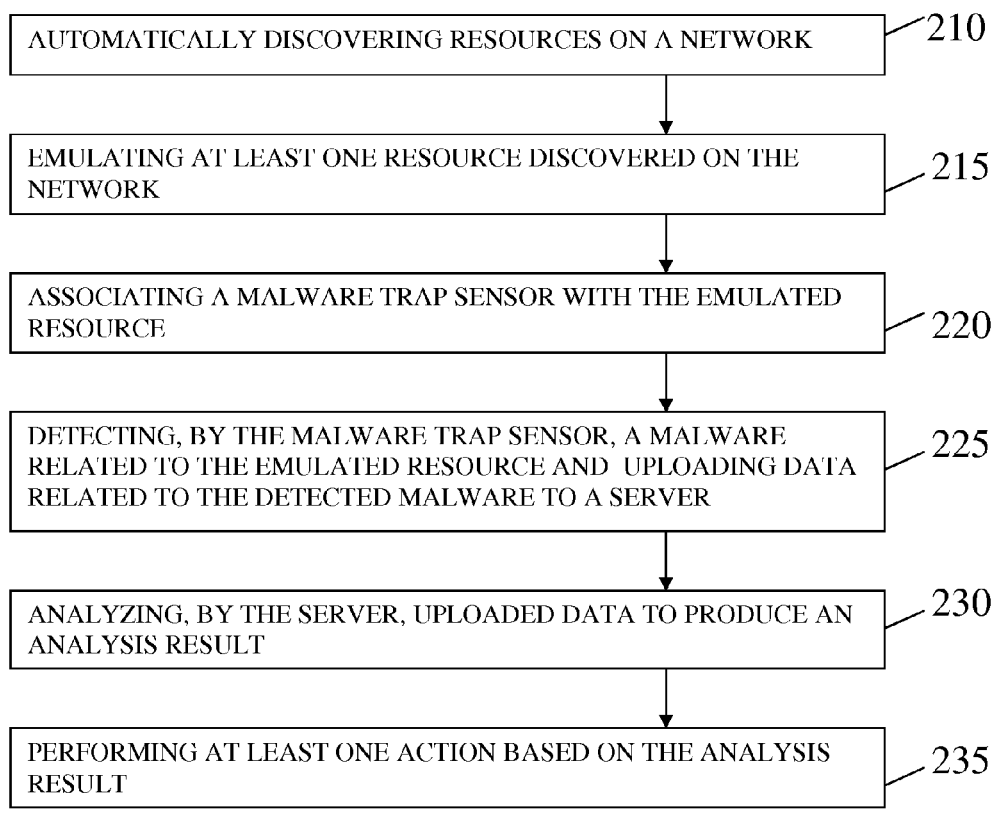
FIG. 2 is a flowchart diagram of a method according to some embodiments of the present invention.

Reference is made to FIG. 2, a flowchart diagram of a method according to some embodiments of the present invention. As shown by block 210, a method or flow may include automatically discovering resources on a network.

For example, resource detection unit 115 may detect or identify resources on network 160 as described herein.

As shown by block 215, a method or flow may include emulating at least one resource discovered on the network. For example, to emulate resources, faked assets creation unit 125 creates, generates or executes faked resources such as faked device 150 or faked service 130. As shown by block 220, a method or flow may include associating a malware trap sensor with the emulated resource. For example, malware trap 151 is associated with faked device 150.

As shown by block 225, a method or flow may include detecting, by the malware trap sensor, a malware related to the emulated resource and uploading data related to the detected malware to a server. For example, malware trap 151 may upload any data related to a malware to server 170. As shown by block 230, a method or flow may include analyzing, by the server, uploaded data to produce an analysis result. For example, server 170 analyzes data uploaded by malware trap 151 as described herein. As shown by block 235, a method or flow may include performing at least one action based on the analysis result. For example, based on analysis of a malware (e.g., analysis of its payload), server 170 may send an electronic mail to a supervisor, re-configuring a router in network 160 etc.

Figure 3:
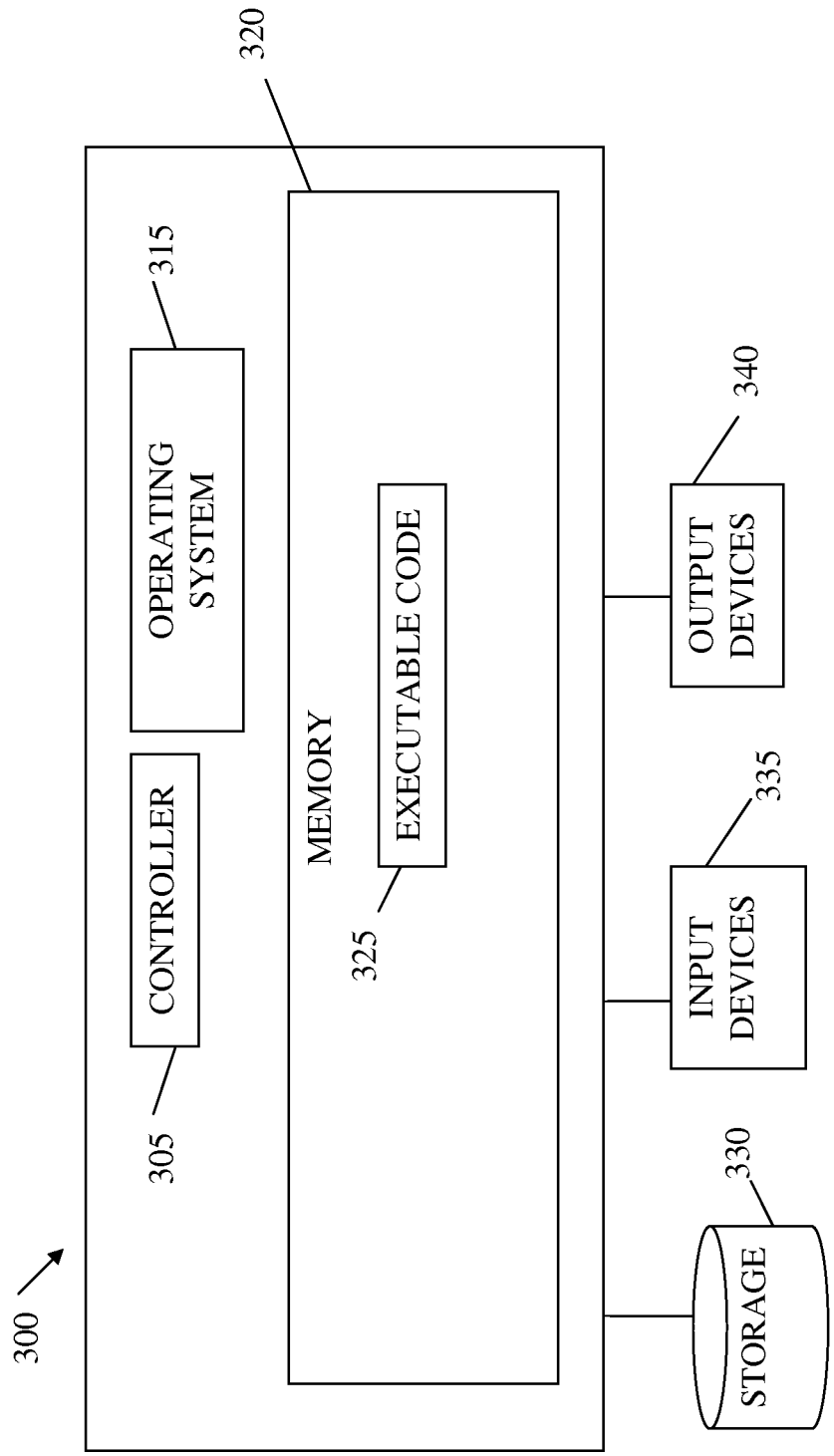
FIG. 3 shows a high level block diagram of an exemplary computing device according to embodiments of the present invention.

Reference is made to FIG. 3, showing high level block diagram of an exemplary computing device 300 according to embodiments of the present invention. As shown, computing device 300 may include a controller 305 that may be, for example, a central processing unit processor (CPU), a chip or any suitable computing or computational device, an operating system 315, a memory 320, a storage 330, an input devices 335 and an output devices 340.

Operating system 315 may be or may include any code segment designed and/or configured to perform tasks involving coordination, scheduling, arbitration, supervising, controlling or otherwise managing operation of computing device 300, for example, scheduling execution of programs. Operating system 315 may be a commercial operating system. For example, in an embodiment, operating system 315 is the Windows operating system provided by Microsoft.

Memory 320 may be or may include, for example, a Random Access Memory (RAM), a read only memory (ROM), a Dynamic RAM (DRAM), a Synchronous DRAM (SD-RAM), a double data rate (DDR) memory chip, a Flash memory, a non-transitory memory or other suitable memory units or storage units. In an embodiment, Memory 320 is a non-transitory processor-readable storage medium that stores instructions and the instructions are executed by controller 305. In an embodiment, when the instructions stored in memory 320 are executed by controller 305 they cause controller 305 to carry out methods described herein. For example, each one of server 170, computer 190 and any computing device executing faked resources or faked assets as described herein may be a device similar to computing device 300.

Resource detection unit 115, faked assets creation unit 125 may be a controller similar to controller 305, memory similar to memory 320 and executable code similar to executable code 325 as shown in FIG. 3 and described herein. Faked service 130, malware trap 131, faked resource 140 and malware trap 141, faked device 150 and malware trap 151 may be or may include a controller similar to controller 305, memory similar to memory 320 and executable code similar to executable code 325 as shown in FIG. 3 and described herein.

Executable code 325 may be any executable code, e.g., an application, a program, a process, task or script. Executable code 325 may be executed by controller 305 possibly under control of operating system 315. For example, executable code 325 may be an application that performs methods described herein. For example, a plurality of executable code segments similar to executable code 325, when executed by a plurality of controllers similar to controller 305 may cause the controllers to carry out methods as shown by FIG. 2 and described herein.

Where applicable, executable code 325 may carry out operations described herein in real-time. Computing device 300 and executable code 325 may be configured to update, process and/or act upon information at the same rate the information, or a relevant event, are received. For example, creating faked assets or resources as described herein may be done in real-time, e.g., immediately upon detecting resources on a network. Other operations, e.g., identifying threats, uploading and analyzing a payload of a malware, presenting data to a user and performing an action when a threat is detected and/or identified may be performed in real-time.

Storage 330 may be or may include, for example, a hard disk drive, a CD-Recordable (CD-R) drive, a universal serial bus (USB) device, an SD memory card or other suitable removable and/or fixed storage unit.

Input devices 335 may be or may include a mouse, a keyboard, a touch screen or pad or any suitable input device. Input devices 335 may include a network interface card (NIC) that enables computing device to communicate over a network, e.g., over networks 180 and 180. Other input devices or components included in input devices 335 may be a touch screen or pad or components that enable voice control and/or interacting with computing device 300 using gestures, e.g., using a touch screen as known in the art. It will be recognized that any suitable number of input devices may be operatively connected to computing device 300 as shown by block 335.

Output devices 340 may include one or more displays, speakers and/or any other suitable output devices. Output devices 340 may include a network interface card (NIC) that enables computing device to communicate over a network. It will be recognized that any suitable number of output devices may be operatively connected to computing device 300 as shown by block 340. A unit or module as described herein (e.g., resource detection unit 115, faked assets creation unit 125 and management unit 175) may be or may include executable code 325 and controller 305. For example, methods described herein may be performed by computing device 300 and units adapted to detect and act on a cyber threats as described herein may be a units that include executable code 325 and controller 305.

Embodiments of the invention may include an article such as a computer or processor non-transitory readable medium, or a computer or processor non-transitory storage medium, such as for example memory 320, a disk drive, or a flash memory, encoding, including or storing instructions, e.g., computer-executable instructions, which, when executed by a processor or controller (e.g., controller 305), carry out methods disclosed herein. For example, a storage medium such as memory 320, computer-executable instructions such as executable code 325 and a controller such as controller 305.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer or a server computer.

Unless explicitly stated, the method embodiments described herein are not constrained to a particular order or sequence. Additionally, some of the described method embodiments or elements thereof can occur or be performed at the same point in time. While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

What is claimed is:

1. A method of detecting a cyber threat, the method comprising:
   automatically discovering real resources on a network, wherein the real resources provide services and wherein the real resources include at least one of: a device and a server;
   faking at least one real resource discovered on the network wherein faking a resource includes advertising at least one service provided by the faked resource;
   detecting an interaction of a malware applications with the faked resource;
   capturing code of the malware applications and storing the code on the faked resource;
   uploading the code to a server;
   analyzing the code, by the server, to produce an analysis result;
   determining, for each of the plurality of payloads, a severity score based on the analysis result;
   providing a report based on the scores; and
   performing at least one action based on the analysis result.

2. The method of claim 1, comprising analyzing network traffic related to the faked resource to detect an interaction of a malware application with the faked resource.

3. The method of claim 1, wherein automatically discovering resources on the network is performed by one of: a virtual machine and a hardware appliance.

4. The method of claim 1, comprising automatically determining a type of the network and faking at least one resource based on the type.

5. The method of claim 1, wherein faking at least one resource includes running a faked service at an operating system kernel level and wherein detecting an interaction of a malware application with the faked resource includes detecting an interaction with the service.

6. The method of claim 1, comprising faking a system and monitoring network traffic from the faked system to detect data sent by malware.

7. The method of claim 1, comprising:
   receiving, by a management unit, from one or more malware traps, data and events related to malware applications;
   analyzing the code of the malware applications to produce an analysis result;
   determining, for each of the malware applications, a severity score based on the analysis result; and
   providing a report based on the scores.

8. The method of claim 1, wherein detecting a malware application related to the faked resource, uploading data related to the detected malware application, analyzing the uploaded data and performing an action based on the analysis are performed in real-time.

9. The method of claim 1, comprising storing faked files on a faked resource and detecting an access to the faked files.

10. The method of claim 1, comprising:
    faking a system;
    detecting a login into the faked system;
    collecting data related to the login and to an entity related to the login;
    sending collected data for analysis by the server; and
    performing an action based on the analysis.

11. The method of claim 1, wherein faked resources are created based on user input.

12. The method of claim 7, wherein a severity score is set based on user input.

13. A system for cyber threats detection comprising:
    a server comprising a management unit;
    a client network;
    an external network; and
    a computer comprising a user interface unit;
    wherein said client network comprises:
        a resource detection unit configured to automatically discover real assets on a network, wherein the real assets provide services and wherein the real assets include at least one of: a device and a server;
        an asset inventory;
        a faked assets creation unit configured to fake at least one real asset discovered on the network wherein faking an asset includes advertising at least one service provided by the faked asset;
        a plurality of faked assets; and
        a malware trap sensor configured to:
            detect an interaction of malware applications with a faked asset, and capture code of the malware applications and upload the code to the server;
    wherein the server is adapted to analyze the code to produce an analysis result;
    determining, for each of the plurality of payloads, a severity score based on the analysis result;
    providing a report based on the scores; and
    perform at least one action based on the analysis result.

14. The system according to claim 13 wherein said resource detection unit is adapted to maintain and update said asset inventory.

15. The system according to claim 13 wherein said faked assets comprise a malware trap.

16. The system according to claim 13 wherein said resource detection unit includes at least a processor and a memory.

17. The system according to claim 13 wherein said resource detection unit is adapted to automatically discover and identify real resources or real assets on said client network.

18. The system according to claim 13 wherein said faked assets creation unit is adapted to create said faked assets.

* * * * *